(12) United States Patent
Farha

(10) Patent No.: US 7,150,902 B2
(45) Date of Patent: Dec. 19, 2006

(54) HIGH $T_G$ COATINGS

(75) Inventor: Said Farha, Pleasantville, NY (US)

(73) Assignee: Pepsico, Inc., Purchase, NY (US)

( * ) Notice: Subject to any disclaimer, the term of this patent is extended or adjusted under 35 U.S.C. 154(b) by 289 days.

(21) Appl. No.: 10/819,763

(22) Filed: Apr. 7, 2004

(65) Prior Publication Data

US 2005/0227083 A1   Oct. 13, 2005

(51) Int. Cl.
*B32B 27/06* (2006.01)
*B32B 27/08* (2006.01)
*B32B 27/28* (2006.01)
*B32B 27/36* (2006.01)
*B32B 17/10* (2006.01)

(52) U.S. Cl. .............. 428/36.6; 428/35.7; 428/36.7; 428/36.91; 428/480; 428/542.8; 428/413; 428/414; 428/415; 428/417; 215/12.1; 215/12.2; 528/101; 528/96; 528/97; 528/99; 528/406; 525/523; 525/524; 525/525; 525/526; 525/528; 427/402; 427/407.1; 427/407.2; 427/412.1; 427/412.5

(58) Field of Classification Search ............... None
See application file for complete search history.

(56) References Cited

U.S. PATENT DOCUMENTS

| | | | |
|---|---|---|---|
| 4,538,542 A | 9/1985 | Kennon et al. ............ 118/302 |
| 5,134,218 A * | 7/1992 | Brennan et al. ............ 528/99 |
| 5,472,753 A * | 12/1995 | Farha .................... 428/35.7 |
| 5,686,551 A * | 11/1997 | White et al. .............. 528/101 |
| 5,834,078 A * | 11/1998 | Cavitt et al. ............. 428/35.7 |
| 6,180,715 B1 * | 1/2001 | Schmidt .................. 524/611 |
| 6,312,641 B1 | 11/2001 | Hutchinson .............. 264/513 |
| 6,352,426 B1 * | 3/2002 | Hutchinson et al. ....... 425/548 |
| 6,391,408 B1 | 5/2002 | Hutchinson .............. 428/35.7 |
| 6,455,166 B1 * | 9/2002 | Truchan et al. ........... 428/471 |
| 6,676,883 B1 | 1/2004 | Hutchinson et al. ....... 264/510 |
| 6,939,591 B1 * | 9/2005 | Hutchinson et al. ....... 428/35.7 |
| 2004/0071885 A1 * | 4/2004 | Hutchinson et al. ...... 427/385.5 |
| 2006/0051451 A1 * | 3/2006 | Hutchinson et al. ....... 425/552 |
| 2006/0062952 A1 * | 3/2006 | Farha et al. ............. 428/35.7 |
| 2006/0065992 A1 * | 3/2006 | Hutchinson et al. ....... 264/45.1 |
| 2006/0073294 A1 * | 4/2006 | Hutchinson et al. ....... 428/35.7 |
| 2006/0073298 A1 * | 4/2006 | Hutchinson et al. ...... 428/36.91 |
| 2006/0099362 A1 * | 5/2006 | Farha ..................... 428/35.2 |
| 2006/0099363 A1 * | 5/2006 | Farha ..................... 428/35.7 |

\* cited by examiner

*Primary Examiner*—Vivian Chen
(74) *Attorney, Agent, or Firm*—Banner & Witcoff, Ltd.

(57) ABSTRACT

Articles are coated by applying a coating composition of a high $T_g$ phenoxy-type material having a $T_g$ of at least about 75° C. to at least a portion of a surface of an article, and forming a dried/cured coating of the high $T_g$ phenoxy-type material on the article surface, where the coating has the high $T_g$ phenoxy-type material and a PHAE; or the article surface comprises a coating includes a PHAE; or the coating has the high $T_g$ phenoxy-type material and a PHAE, and the article surface includes a coating layer of a PHAE.

17 Claims, 8 Drawing Sheets

HIGH $T_G$ COATINGS

BACKGROUND OF THE INVENTION

1. Field of the Invention

The present invention is generally directed to coatings for plastic and glass articles. In particular, the present invention is directed to phenoxy-based coatings for articles, such as preforms and bottles, having improved resistance to chemicals, abrasion, and heat.

2. Discussion of Related Art

Laminates, such as multilayer preforms and containers having at least one layer of a gas barrier material, i.e., materials having a gas permeability less than that of the substrate, are known. For example, U.S. Pat. No. 5,472,753 to Farha discloses two and three layer laminates, such as preforms and bottles. In the disclosed three layer laminates, the first layer is a phenoxy-type thermoplastic, the second is an amorphous thermoplastic copolyester, and the third is polyethylene terephthalate. In the two-layer laminates, the first layer is a blend of the phyenoxy-type thermoplastic and amorphous thermoplastic copolyester, and the second layer is polyethylene terephthalate ("PET"). The disclosed phenoxy-type thermoplastics include poly(hydroxy ethers), poly(hydroxy ester ethers), and poly(hydroxy amino ethers), and the preferred amorphous thermoplastic polyester is poly(1,4-cyclohexylinemethylene) terephthalate-co-isophthate, which is formed by replacing part of the ethylene glycol and terephthalic acid in PET with cyclohexane dimenthanol and isophthalic acid, respectively. Also, for the purposes of the disclosed invention, PET refers to PET homopolymers as well as copolymers of ethylene terephthate in which up to about 10 mole percent of the ethylene glycol is replaced by other monomeric units, such as diethylene glycol, propane-1,3-diol, butane-1,4-diol, polytetramethylene glycol, polyethylene glycol, polypropylene glycol, 1,4-hydroxymethylcyclohexane, and the like, and up to about 10 mole percent of the terephthalic acid is replaced by monomeric units, such as isophthalic, bibenzoic, naphthalene 1,4- or 2,6-dicarboxylic, adipic, sebacic, decane-1,10-dicarboxylic acids, and the like. For preforms and containers, the inner layer is preferably the PET layer.

U.S. Pat. Nos. 6,312,641, and 6,391,408 and U.S. patent application Ser. No. 10/152,318 to Hutchinson et al. disclose plastic articles, such as bottles and preforms, comprising one or more layers of thermoplastic material, having good gas-barrier characteristics, and methods of making such articles. The disclosed plastic articles are formed from a thermoplastic polyester onto which a barrier layer is applied. The preferred thermoplastic polyester is PET, but other thermoplastic polyesters, i.e., polyethylene 2,6- and 1,5-naphthalate ("PEN"), PETG, polyethylene 1,2-dioxybenzoate, and copolymers of ethylene terephthalate and ethylene isophthalate, are also disclosed. Copolyesters of terephthalic acid, isophthalic acid, and at least one diol are excluded as substrate materials, as those materials are considered barrier materials for the purpose of the invention. The barrier layer is formed from either a copolyester barrier material, i.e., the copolyester of terephthalic acid, isophthalic acid, and at least one diol, and phenoxy-type thermoplastic materials, i.e., hydroxy functional poly(amide ethers), poly(hydroxy amide ethers), hydroxy-functional polyethers, hydroxy-functional poly(ether sulfonamides), poly(hydroxy ester ethers), hydroxy-phenoxyether polymers, and poly(hydroxy amino ethers) ("PHAE"). In addition to disclosing various injection molding techniques, applying barrier coating layers using various dip, spray, and flow coating methods is also disclosed.

As will be recognized by those skilled in the art, the formation of multiple layers on an article may be desirable in some applications, but, no matter what method is used to form the layers, adds complexity and, typically, cost to the manufacture of the article. Therefore, limiting the number of layers in an article, where feasible, may be desirable for economic reasons. As a result, particularly in preforms and containers intended for consumable products, materials, such as gas barriers, that are not approved by the FDA for contact with food preferably perform double duty as the outer, protective layer of the article.

A variety of characteristics are desirable in an outer layer for glass and plastic articles. First, particularly for containers, such as bottles and jars that are subject to the environment of a fill line, the outer layer of the container preferably has good abrasion and chemical resistance, such that the article is resistant to the fill line environment, where a bottle is exposed to physical abrasion, as well as lubricants and beverages or other container contents that may be corrosive. The coating material is preferably also compatible, i.e., miscible, with various colorants, such as pigments and UV blockers, such that, for spray, dip, and flow coating methods, the coating material forms a stable dispersion with the colorant or UV blocker.

In addition, the glass transition temperature, $T_g$, of the coating on a thermoplastic preform that is intended for blow molding into a hot-fill container should be relatively high, as, during blow molding, the preform is placed in a blow mold having a temperature of about 140° C. As a result, an outer layer having a relatively low $T_g$, such as a PHAE material, which has a $T_g$ in the range of from about 50° C. to about 70° C., has a tendency to stick to the inner surface of the blow mold. Therefore, with relatively low $T_g$ materials, there is the potential for the production of final products having unacceptable imperfections, damage to the mold, and production line down time.

It has been found that cross-linking the coating material improves its chemical and abrasion resistance. However, one cannot induce a high degree of cross-linking to a preform coating, as a fully cross-linked thermoset material would not stretch during the blow molding step. Subsequently, low levels of cross-linking do not significantly improve chemical and abrasion resistance of the coating. Further, the problems associated with blow molding a relatively low $T_g$ material into a hot-fill container still persist.

In some applications, it may also be desirable to blend an ultraviolet ("UV") blocker, a pigment, or other additive to the coating. Therefore, as noted above, compatibility between the additive and the coating composition is critical in such applications. However, it has been discovered that in dip, spray, and flow coating methods, such as those disclosed by Hutchinson et al., UV blockers and pigments are incompatible with dispersions of PHAE materials, rapidly precipitating from the dispersion due to insufficient wetting of the additive by the PHAE material.

Therefore, a need exists for a coating composition that has the low gas permeability of a PHAE material, with improved chemical and abrasion resistance, $T_g$, and compatibility with pigments and UV blockers. The present invention provides such a composition.

SUMMARY OF THE INVENTION

The present invention provides novel methods of coating an article, articles coated with the methods of the invention, coating compositions for use in the method of the invention, and coated articles that overcome the deficiencies of the prior art. The method of the invention comprises applying a coating composition comprising a high $T_g$ phenoxy-type material having a $T_g$ of at least about 75° C., preferably from about 75° C. to about 110° C., to at least a portion of a surface of an article, and forming a dried/cured coating comprising the high $T_g$ phenoxy-type material on the article surface. The coating comprising the high $T_g$ phenoxy-type material further comprises a PHAE, and/or the article surface coated with the high $T_g$ phenoxy-type material comprises a coating comprising a PHAE. The applied coating composition is preferably a dispersion, comprising the high $T_g$ phenoxy-type material, which may further comprises a PHAE. Although dispersions of the phenoxy-type materials are preferred in the invention, solutions of the materials may also be used.

The coating composition, which is preferably a dispersion, comprising at least one phenoxy-type material, may further comprise at least one additive, such as a UV blocker, a pigment, or a metallized pigment. Some additives are incompatible with the PHAE, such that the additives precipitate from a dispersion comprising the additive and the PHAE, when the dispersion does not further comprise the high $T_g$ phenoxy-type material. In contrast, such additives are compatible with dispersions comprising the high $T_g$ phenoxy-type material, and, thus, do not precipitate, even when the dispersion comprises a PHAE. Where the additive is incompatible with the PHAE dispersion, the additive is preferably blended with the high $T_g$ phenoxy-type material prior to mixing the high $T_g$ phenoxy-type material with the PHAE to form the dispersion.

A coating composition comprising a high $T_g$ phenoxy-type coating material may be applied by any of dip, spray, and flow coating, either alone or in combination, or by overmolding the high $T_g$ phenoxy-type material onto the article, preferably using the inject-over-inject method disclosed by Hutchinson. The article to be coated may be coated with a PHAE coating layer, such as by any of overmolding, dip, spray, or flow coating, prior to the application of the high $T_g$ phenoxy-type material, or the high $T_g$ phenoxy-type material and the PHAE may be melt blended, such as in an extruder, prior to overmolding or dip, spray, or flow coating the article. Such melt blends may also be used to prepare dispersions of the resins, and applied by dip, spray, or flow coating.

In those applications where a coating composition in accordance with the invention comprises two resins, the first resin is a high $T_g$ phenoxy-type material, and the second resin is preferably a PHAE material. Preferably, in such a blend of resins, the two resins are present in a weight ratio of phenoxy-type material to PHAE of from about 10:90 to about 50:50, and, more preferably, from about 20:80 to about 40:60, based on the total weight of the two resins. The composition may be one of a dispersion of the two resins, adapted for dip, spray, or flow coating, or a melt blend of the two resins, adapted for overmolding.

Coated articles in accordance with the invention comprise an article substrate, having a surface, and a coating layer comprising a high $T_g$ phenoxy-type material having a $T_g$ of at least about 75° C. on at least a portion of the surface of the article. The coating layer comprising the high $T_g$ phenoxy-type material may further comprise a PHAE, and/or a coating layer comprising a PHAE may be positioned between the coating layer comprising the high $T_g$ phenoxy-type material and the article substrate surface.

DETAILED DESCRIPTION OF PREFERRED EMBODIMENTS

Figure 1:
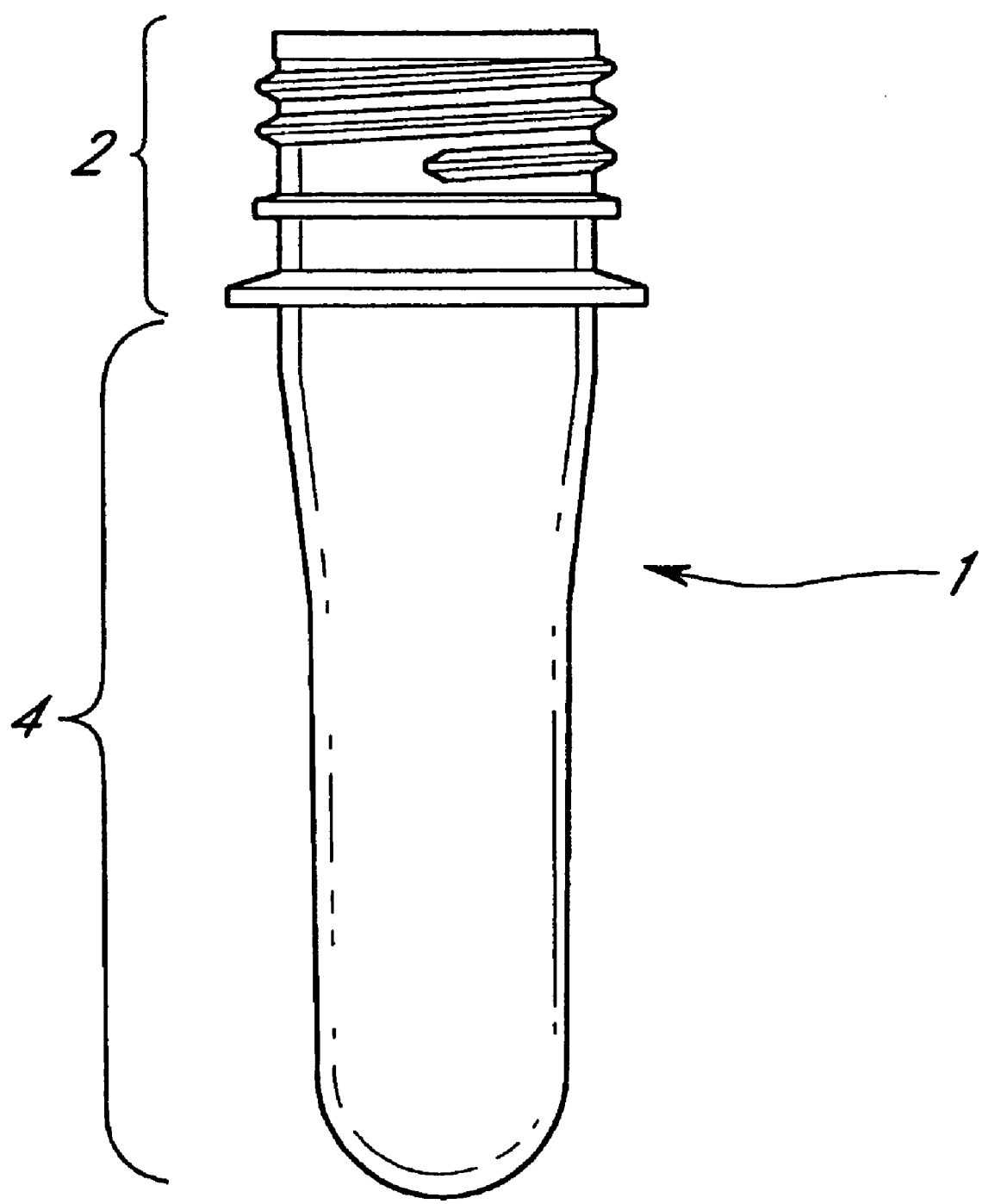
FIG. 1 illustrates an uncoated preform that may be coated with the coatings and methods of the invention.

As used herein, the term "phenoxy-type" with regard to such materials or resins refers to polyhydroxy ethers with terminal alpha glycol groups. The backbone ether linkages and pendant hydroxyl groups promote wetting and bonding to polar substrates and fillers. Typical phenoxy-type resins have weight-average molecular weight ranging from approximately 25,000 to above 60,000. An average phenoxy-type resin molecule contains forty or more regularly spaced pendant hydroxyl groups suitable for crosslinking.

As used herein, the term "polyhydroxyamino ethers" ("PHAE") refers to the reaction products of epoxy based resins, such as a diglycidyl ether of bis-phenol A ("DGEBA") with primary amines such as ethanolamine. It is believed that the pendant hydroxyl groups on the main PHAE backbone contribute to strong interchain hydrogen bonding, high intermolecular cohesive energy density, and excellent barrier properties for gases, such as oxygen and carbon dioxide. The literature indicates that further improvement to the PHAE barrier can be obtained by copolymerizing resorcinol diglycidyl ether ("RDGE") with the above-mentioned ingredients. The RDGE based copolymers of PHAE will also be considered to fall within the definition of PHAE for purposes of this disclosure.

As used herein, the term "high $T_g$ phenoxy-type material" refers to a thermoplastic phenoxy-type material having a glass transition temperature of at least about 75° C., preferably about 75° to about 100° C. The high $T_g$ phenoxy-type materials useful in the invention have a $T_g$ significantly higher than that of PHAE, and significantly better chemical, water, and abrasion resistance than do PHAE.

The present invention is directed to compositions for coating articles, such as thermoplastic preforms and containers, as well as glass articles, where the coatings have the low gas permeability of a PHAE composition and the high $T_g$, chemical and abrasion resistance, and compatibility with additives, such as UV blockers and pigments, provided by high $T_g$ phenoxy-type materials. The invention is further directed to plastic and glass articles coated with the compositions of the invention and to methods of coating such articles. Although the disclosure of the present invention is particularly directed to coated thermoplastic preforms and containers, it will be recognized by those of skill in the art that the present invention is applicable to any type of article, including, but not limited to, coated glass articles, such as bottles, as well as plastic preforms and containers and other plastic articles.

It has been discovered that, while the gas permeability of phenoxy-type materials is inferior to that of PHAE materials, the high $T_g$ phenoxy-type materials have a number of advantages. In particular, high $T_g$ materials have a higher $T_g$, superior chemical and abrasion resistance, superior wetting properties, providing compatibility with color pigments, and superior compatibility and miscibility with UV blockers, when compared to PHAE materials.

As noted above, the relatively low $T_g$ of PHAE materials may not be compatible with hot blow molds and hot-fill containers. In particular, when used as the outer layer of a preform, a PHAE material, having a $T_g$ in the range of about 50° C. to about 70° C., can stick to the mold following blow molding. Moreover, exposure to hot liquids during a hot-fill operation can damage such relatively low $T_g$ materials.

In addition, although a layer of PHAE material may be applied to a substrate by dip, spray, or flow coating a dispersion of the PHAE material, the wetting capabilities of PHAE materials are relatively poor, and, thus, many additives, such as pigments and UV blockers, precipitate from PHAE dispersions. As a result, PHAE-based coatings, containing certain additives, such as pigments and UV blockers, are difficult, if not impossible, to form from dispersions of PHAE material.

In contrast to the PHAE materials, it has been discovered that high $T_g$ phenoxy-type materials, having a $T_g$ of at least about 75° C., have an improved resistance to sticking to a blow mold due to the higher $T_g$, and also have significantly better chemical resistance, compared to PHAE material based coatings, when exposed to hot liquids and lubricants on a fill line. The resistance on high $T_g$ phenoxy-type materials to abrasion is also superior to that of PHAE materials without requiring cross-linking. However, if desired, a cross-linker of any useful type known in the art, such as a melamine formaldehyde based cross-linker may be used, as long as the coating material remains flexible for expansion during stretch blow molding.

The high $T_g$ phenoxy-type materials may also be applied to a substrate by dip, spray, and/or flow coating the surface of the substrate with a water-based dispersion of the high $T_g$ phenoxy-type material. However, it has been found that the superior wetting properties of high $T_g$ phenoxy-type materials greatly improves the compatibility of additives, such as UV blockers and pigments with high $T_g$ phenoxy-type materials compared to PHAE materials. As a result, additives that improve the UV resistance, provide color to the article, or provide other desirable properties to the article, do not precipitate from dispersions of high $T_g$ phenoxy-type materials. In particular, it has been found that metallized pigments can be dispersed in a high $T_g$ phenoxy-type material at significantly higher loadings than is possible with PHAE materials. This allows the formation of a metallized texture on the surface of a substrate.

Although the substrate is preferably a thermoplastic material, such as a thermoplastic polyester, e.g., PET and PEN, the dispersions of PHAE and high $T_g$ phenoxy-type materials useful in the present invention may also be used to coat glass substrates.

The method of the invention provides articles having coatings that provide the advantages of both PHAE materials and high $T_g$ phenoxy-type materials. That is, the method of the invention provides coating layers having the gas barrier properties of a PHAE material and the relatively high $T_g$, chemical and abrasion resistance, and compatibility with additives of a high $T_g$ phenoxy-type material.

In one embodiment, the method of the present invention comprises providing a dispersion of a PHAE material and a dispersion of a high $T_g$ phenoxy-type material, and blending the two dispersions. An acid, such as lactic or phosphoric acid may be added to stabilize the dispersion. The blend of the two dispersions is then applied to a surface of a substrate by dip, spray, or flow coating. As the high $T_g$ phenoxy-type material is compatible with additives that can provide one or more desired properties to the final product, such as UV blockers, pigments, and metallized pigments, the method of the invention may further comprise blending at least one useful additive into the dispersion of high $T_g$ phenoxy-type material prior to blending the two dispersions.

In another preferred embodiment, the PHAE and high $T_g$ materials are melt blended in an extruder. A dispersion of the blend may be formed, and applied to a surface of a substrate, or the melt blend may be overmolded onto the substrate, such as by the inject-over-inject ("IOI") and LIM-over-inject techniques disclosed by Hutchinson. It has been found that additives, such as UV blockers and pigments may be blended with the melt blend or dispersed in the dispersion of the blend. The presence of the high $T_g$ phenoxy-type material provides the compatibility required to form a dispersion and/or suspension comprising one or more additives. Preferably, any additive is added to the dispersion prior to the addition of the PHAE material.

In a further embodiment, a single PHAE-based layer is formed on a substrate by dip, spray, or flow coating a dispersion of PHAE onto a surface of a substrate or by directly overmolding the resin. A layer comprising a high $T_g$ phenoxy-type material, with or without one or more additives is then applied to the PHAE coated surface by dip, spray, or flow coating or by directly overmolding the resin.

As a representative illustration of articles that can be coated with the methods of the invention to prepare the coated articles of the invention, an uncoated preform 1 is illustrated in FIG. 1. Those of skill in the art will recognize that the present invention is not limited to preforms and containers made from preforms. Preferably, the preform 1 is formed from an FDA approved material, such as virgin PET, and can be of any useful shape and size suitable for stretch-blow molding into a container. As will also be recognized by those skilled in the art, the inner surface of a preform for making containers that will contain food or beverages must be formed from an FDA approved material. As illustrated, the preform 1 is of the type used to form a 16 oz carbonated beverage bottle that may be coated with oxygen and/or carbon dioxide barrier layers. However, as will be understood by those skilled in the art, the size, shape, and thickness of a preform will depend upon the desired size, shape, thickness, and use of the final article. Preferably, the preforms are formed using injection molding techniques known in the art, but may be formed using any useful molding method that will provide the desired preform.

Figure 2:
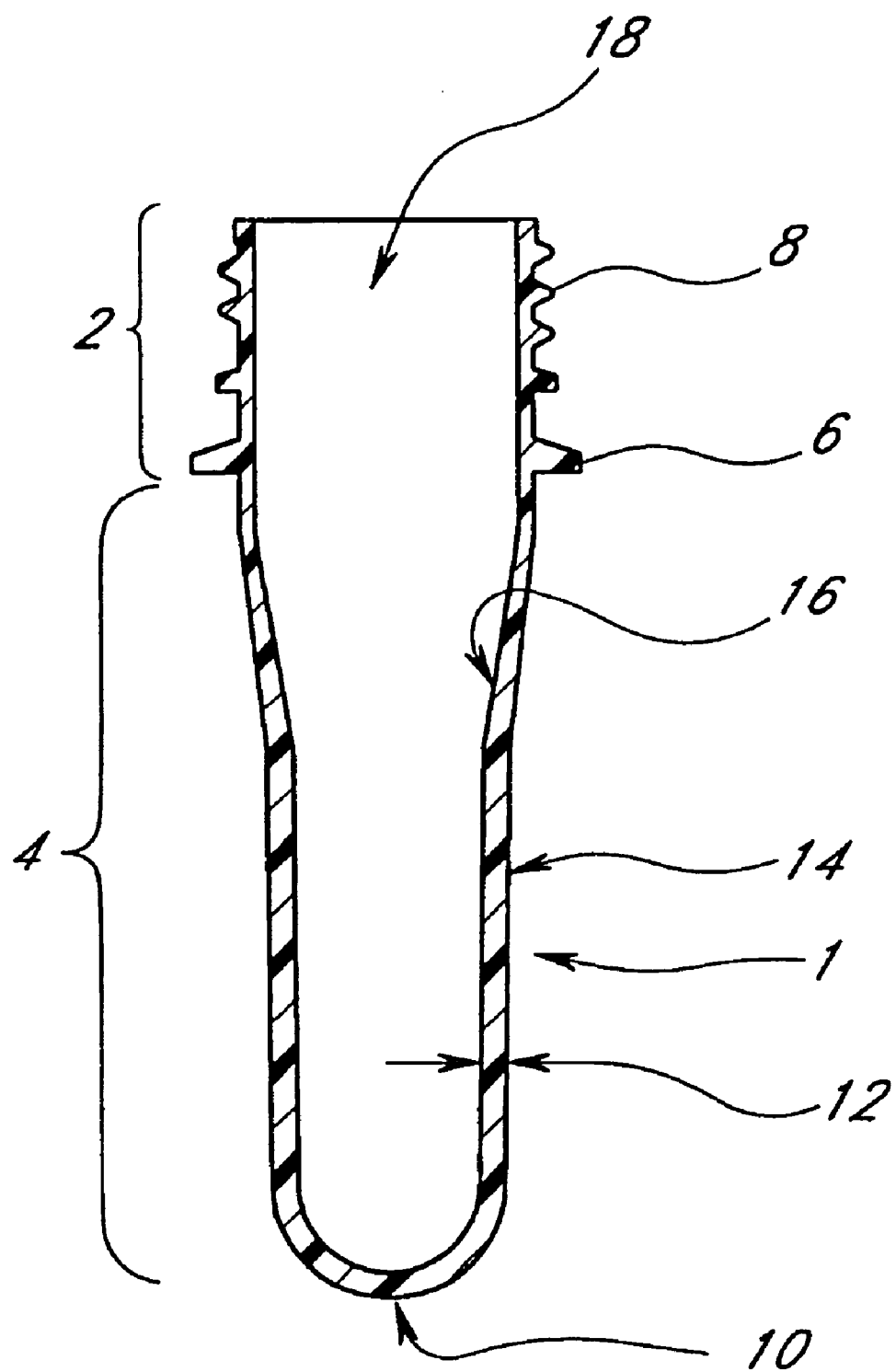
FIG. 2 illustrates a cross-section of the preform illustrated in FIG. 1.

A cross-section of the representative uncoated preform 1 illustrated in FIG. 1 is illustrated in FIG. 2. The uncoated preform 1 has a neck portion 2 and a body portion 4. The neck portion 2 defines an opening 18 to the interior of the preform 1, begins at the opening 18, and extends to and includes a support ring 6. As illustrated in FIGS. 1 and 2, the neck portion 2 is further characterized by the presence of the threads 8, which provide a means for fastening a cap for the bottle produced from the preform 1. However, as will be recognized by those of skill in the art, any known means for securing a cap or top to a container, such as a bottle, may be used. The body portion 4 is an elongated, cylindrically shaped structure extending down from the neck portion 2, having an outer surface 14, and culminating in the rounded end cap 10. The preform thickness 12 will depend upon the overall length of the preform and the wall thickness and overall size of the resulting container.

Figure 3:
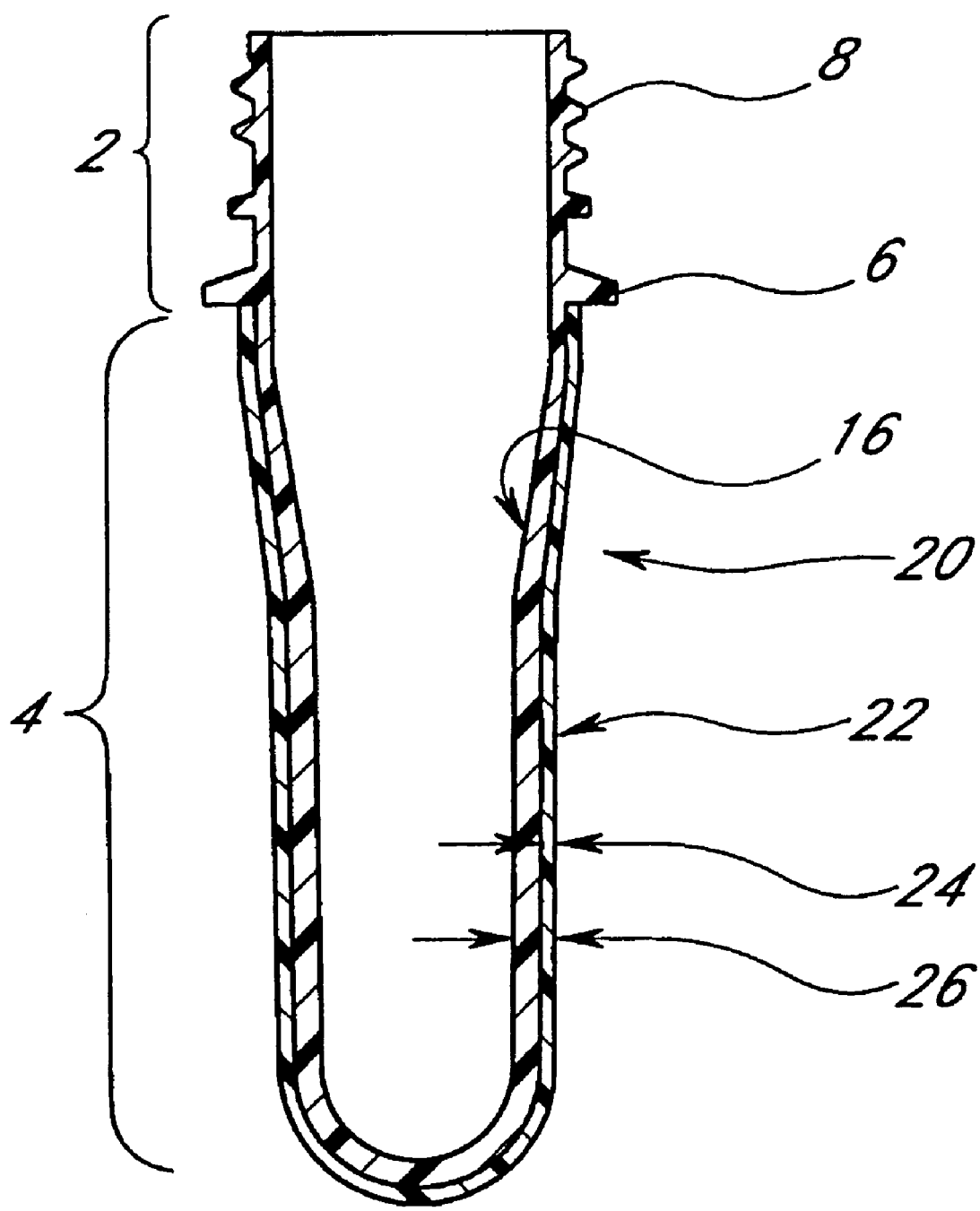
FIG. 3 illustrates a cross-section of a coated preform of the invention.

FIG. 3 is a cross-sectional illustration of a non-limiting, representative coated preform 20 in accordance with the invention that has been coated in accordance with the invention; i.e., preferably, by dip, spray, or flow coating with a dispersion comprising a high $T_g$ phenoxy-type material and PHAE; by dip, spray, or flow coating, first, with a dispersion comprising PHAE, and, second, with a dispersion comprising a high $T_g$ phenoxy-type material; by overmolding with a PHAE resin and then a high $T_g$ phenoxy-type resin; or by overmolding with a blend of PHAE resin and a high $T_g$ phenoxy-type resin. The coated preform 20 is essentially the preform illustrated in FIGS. 1 and 2, but has been coated with the materials and methods of the invention. As with the preform 1, illustrated in FIGS. 1 and 2, the coated preform 20 has a neck portion 2 and a body portion 4.

The coating layer 22, which is preferably a barrier-coating layer, is disposed about the entire surface of the body portion 4, terminating at the bottom of the support ring 6. The coating layer 22 does not extend to the neck portion 2, nor is it present on the interior surface of the preform 16, which, as discussed above, is preferably made of an FDA approved material, such as PET or PEN. The coating layer 22 may comprise either a single material or several microlayers of at least two materials, where at least one of the microlayers comprises a high $T_g$ phenoxy-type material.

The thickness of the overall preform 26 is equal to the thickness of the initial preform plus the thickness of the layer 24, and is dependent upon the overall size and desired coating thickness of the resulting container. For example, a preform in accordance with the invention may have a thickness of 3.2 millimeters in the wall of the bottom portion of the preform; a thickness in the wall of the neck finish of about 3 millimeters; and a layer of barrier material with a thickness of about 0.3 millimeters.

Figure 4:
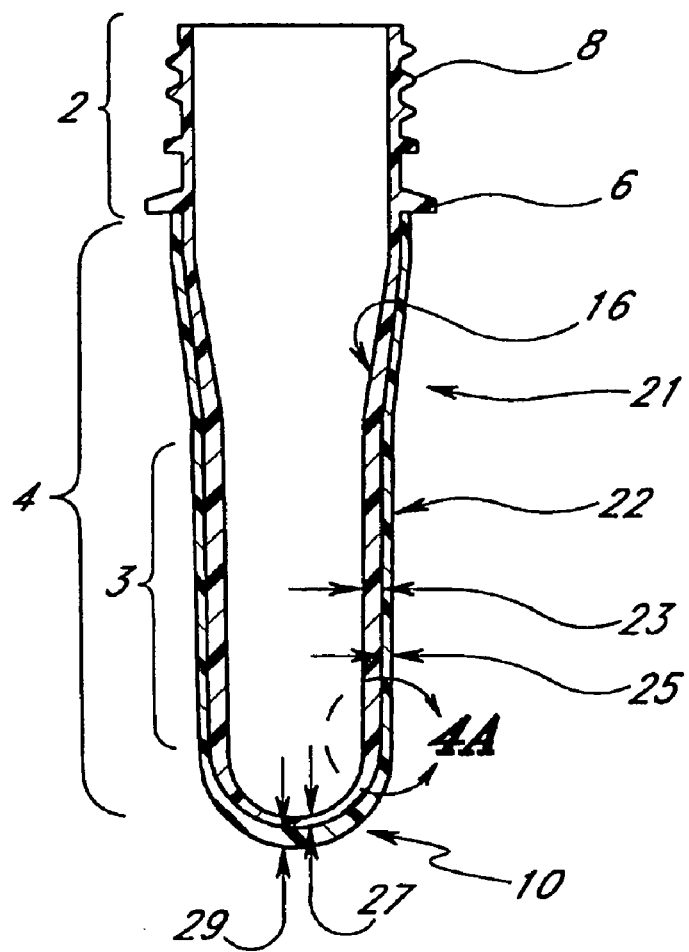
FIG. 4 illustrates a cross-section of a coated preform of the invention, where the thicknesses of the layers differ from those of the preform illustrated in FIG. 3.

A further embodiment of a representative coated article in accordance with the invention, i.e., coated preform 21, is illustrated in FIG. 4 in cross-section. The coated preform 21 differs from the coated preform 20 in FIG. 3 primarily in the relative thickness of the two layers in the area of the end cap 10. In coated preform 20, the coating layer is generally thinner than the thickness of the initial preform throughout the entire body portion of the preform. In coated preform 21, however, the coating layer 22 is thicker at the point 29 of the end cap 10 than it is at the point 25 in the wall portion 3, and conversely, the thickness of the inner thermoplastic layer at point 23 in the wall portion 3 is greater than the it is at the point 27 in the end cap 10. This preform design is especially useful when the coating is applied to the initial preform in an overmolding process, to make the coated preform, where it presents certain advantages including that relating to reducing molding cycle time. The coating layer 22 may be homogeneous or it may be comprised of a plurality of microlayers, as discussed above, and illustrated in FIG. 4A, discussed below.

Figure 4A:
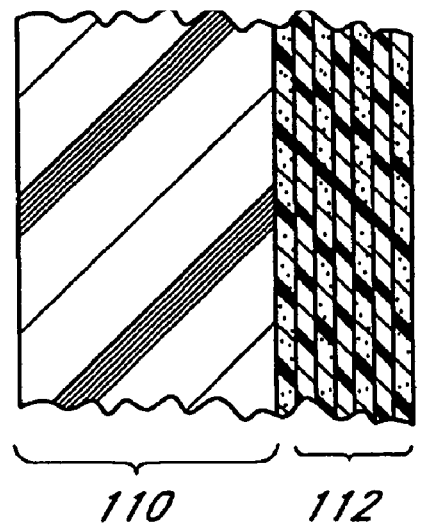
FIG. 4A illustrates a portion of a wall section of the preform of FIG. 4 in which the coating layer comprises a plurality of layers.

FIG. 4A illustrates a portion of a wall section of the preform 21 in which the coating layer 22 comprises a plurality of layers 112. The layer 110 is the inner layer of the preform, and the plurality of layers 112 forms the outer layer 22 of the preform 21. The outer layer 112 comprises a plurality of microlayers of material, such as that made using the lamellar injection molding ("LIM") techniques disclosed by Hutchinson, in which at least one of the microlayers comprises a high $T_g$ phenoxy-type material, and at least one of the microlayers preferably comprises PHAE, where, when the high $T_g$ phenoxy-type material and the PHAE are in separate layers, the high $T_g$ phenoxy-type material is external to the PHAE layer. As will be recognized by those skilled in the art, not all preforms 21 of the type illustrated in FIG. 4 necessarily have an outer layer comprising a plurality of microlayers, as illustrated in FIG. 4A.

Figure 5:
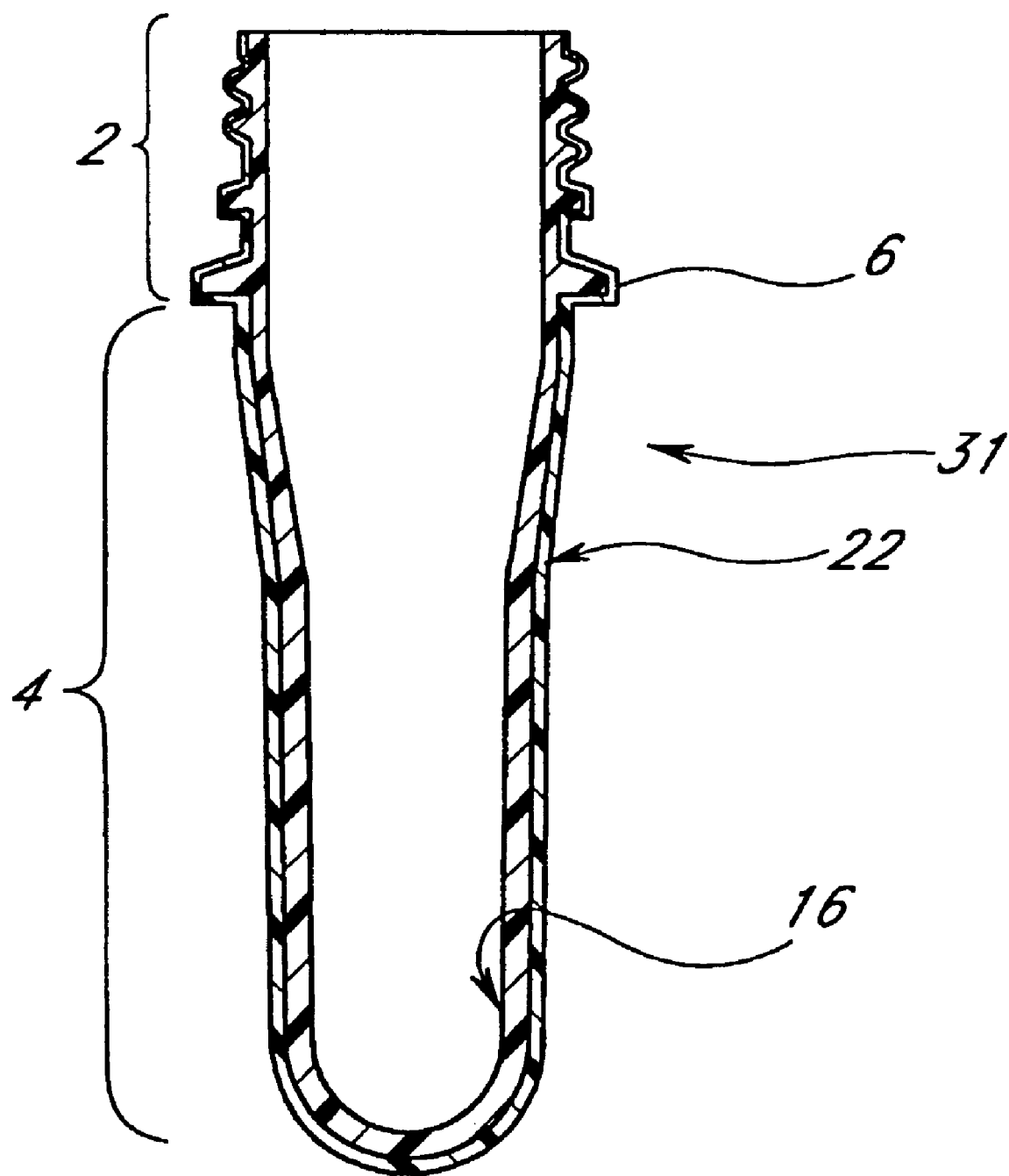
FIG. 5 illustrates a cross-section a coated preform of the invention, where the entire outer surface is coated.

FIG. 5 illustrates a further embodiment of a non-limiting, representative coated preform 31 in cross-section. The coated preform 31 differs primarily from the coated preforms 20 and 21 illustrated in FIGS. 3 and 4, respectively, in that the coating layer 22 is disposed on the neck portion 2, as well as the body portion 4.

The layers of preforms and containers of the present invention can have relative thicknesses that vary from one preform or container to another, such that the thickness of a given layer and of the overall preform or container, whether at a given point or over the entire container, can be chosen to fit a coating process or a particular end use for the container. Moreover, as discussed above, the coating layer in the preform and container embodiments disclosed herein may comprise a single material or several microlayers of two or more materials.

Figure 6:
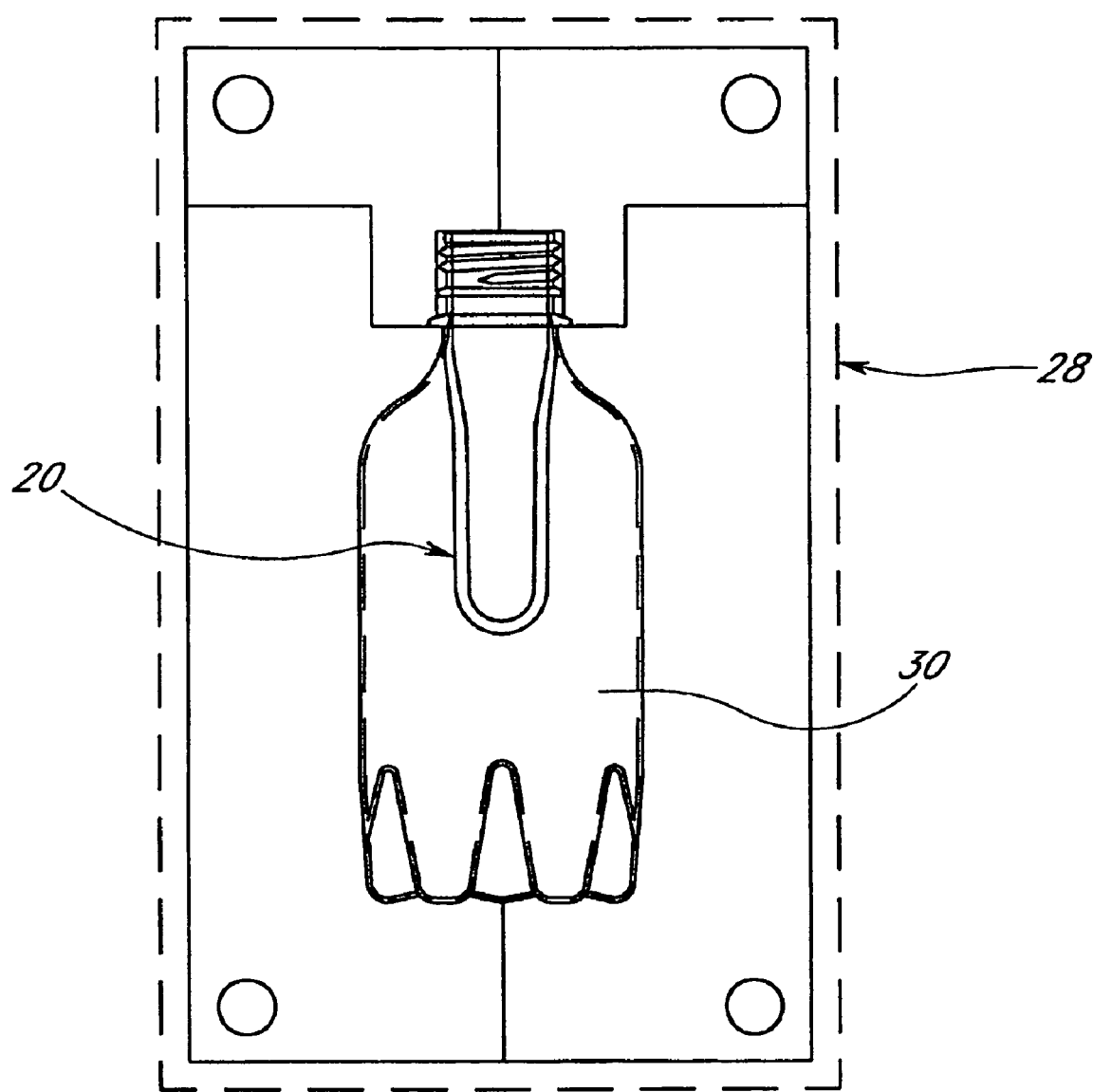
FIG. 6 illustrates a cross-sectional of a preform in the cavity of a blow-molding apparatus of the type used to make a coated container of the invention.

Typically, a coated preform, such as those illustrated in FIGS. 3 to 5, is subjected to a stretch blow-molding process to form a bottle or other container. As illustrated in FIG. 6, a coated preform 20 is placed into a blow mold 28, having a cavity 30 corresponding to the desired container shape. The coated preform 20 is heated and expanded in the blow mold 28 by stretching the preform vertically, and by forcing air into the interior of the preform 20 to laterally stretch the preform 20, such that the preform 20 takes on the shape of the blow mold, thereby creating a coated container. As the outer layer of the preform comprises a high $T_g$ phenoxy-type material, the amount of sticking of the blown container, compared to PHAE-coated containers, is substantially reduced, if not eliminated. The blow molding operation normally is restricted to the body portion 4 of the preform, such that the neck portion 2, including the threads, pilfer ring, and support ring, retain the original shape molded into the preform.

Figure 7:
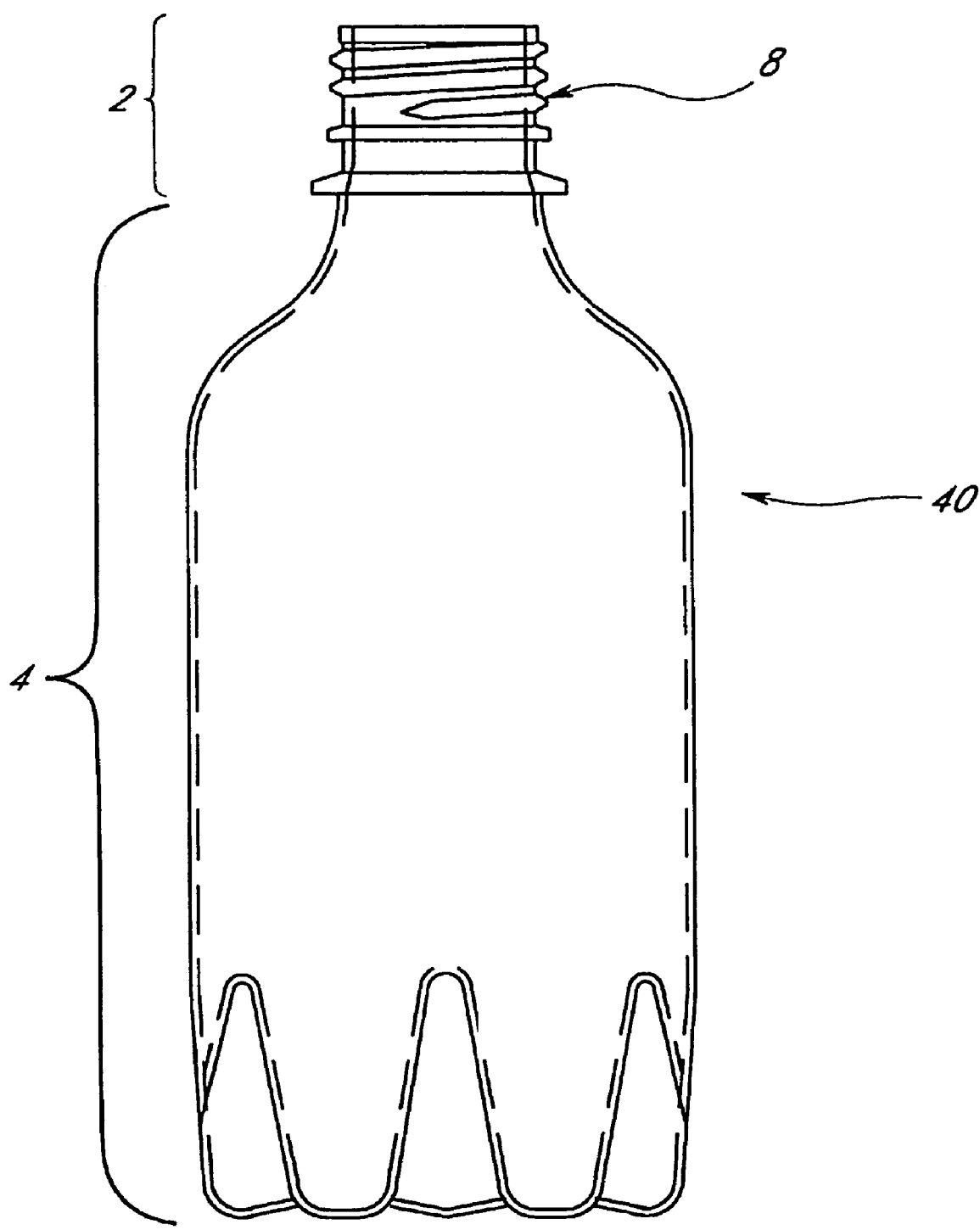
FIG. 7 illustrates a coated container of the invention.

One embodiment of a representative coated container 40 in accordance with the present invention is illustrated in FIG. 7, where the container 40 is of the type that is molded from a coated preform 20, such as that illustrated in FIG. 3. The container 40 has a neck portion 2 and a body portion 4 corresponding to the neck 2 and body 4 portions of the coated preform 20 of FIG. 3. As illustrated, the neck portion 2 is further characterized by the presence of the threads 8 which provide a means for fastening a cap onto the container.

Figure 8:
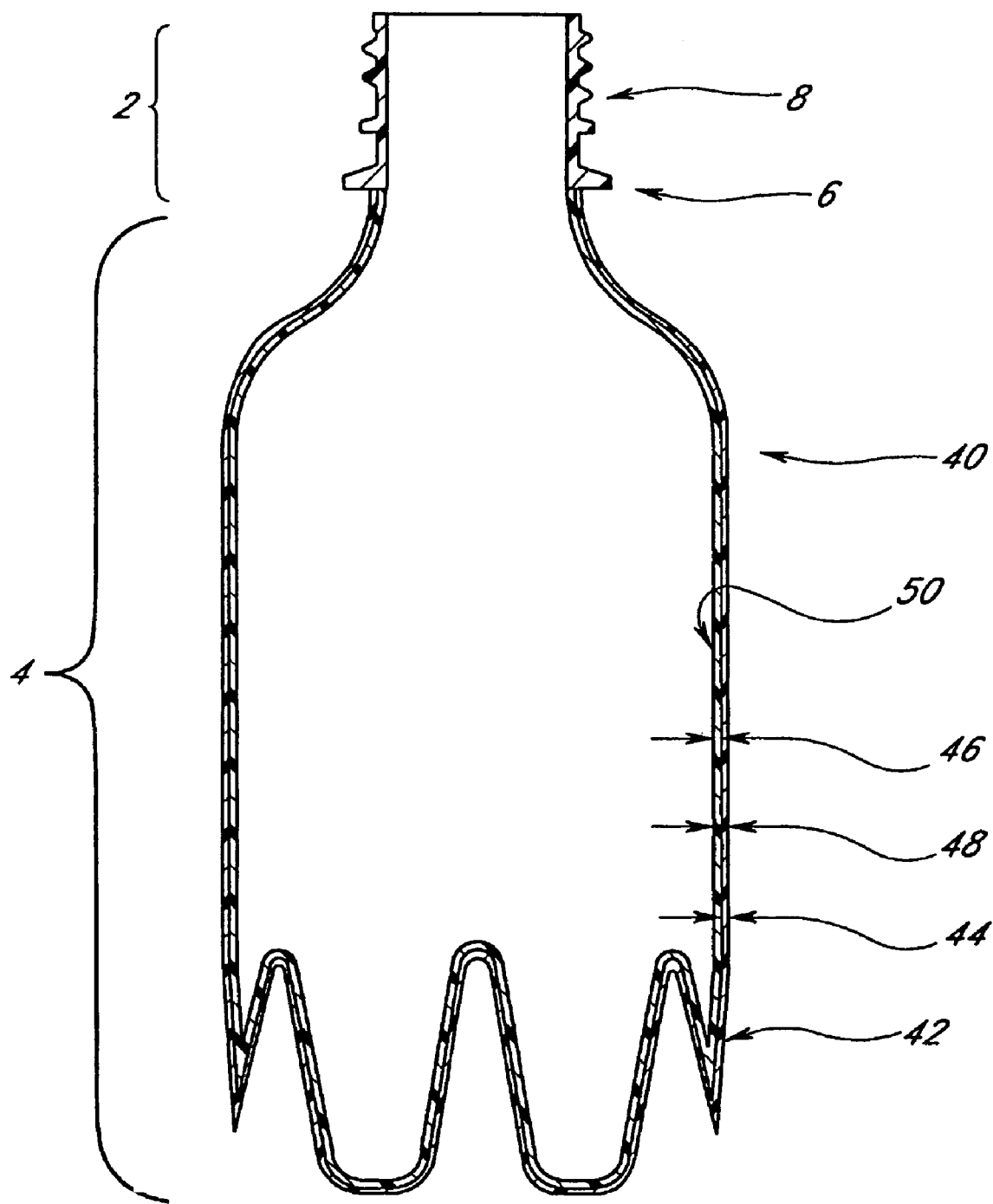
FIG. 8 illustrates a cross-section of the coated container illustrated in FIG. 7.

When the coated container 40 is viewed in cross-section, as illustrated in FIG. 8, the construction can be seen. The coating 42 covers the exterior of the entire body portion 4 of the container 40, stopping just below the support ring 6. The interior surface 50 of the container, which should be made of an FDA-approved material for consumable contents, preferably PET, remains uncoated so that only the interior surface is in contact with beverages or foodstuffs. In one embodiment, for use with carbonated beverages, the thickness 44 of the coating on the container is preferably about 0.020 to about 0.060 inch (about 0.51 to about 1.52 mm), more preferably about 0.030 to about 0.040 inch (about 0.76 to about 1.02 mm); the thickness of the inner layer 46 is preferably about 0.080 to about 0.160 inch (about 2.03 to about 4.064 mm), more preferably about 0.100 to about 0.140 inch (about 2.540 to about 3.556 mm); and the overall wall thickness 48 of the coated container 40 is preferably about 0.140 to about 0.180 inch (about 3.556 to about 4.572 mm), more preferably about 0.150 to about 0.170 inch (about 3.810 to about 4.318 mm). Preferably, on average, the overall wall thickness 48 of the container 40 derives the majority of its thickness from the inner layer.

As noted above, a preform coated in accordance with the present invention may also be produced by dip coating the preform in a bath that contains a dispersion of high $T_g$ phenoxy-type and PHAE resins, or, sequentially, into a first bath containing a dispersion of PHAE and a second bath that contains a dispersion of a high $T_g$ phenoxy-type material. The dipping of the preforms into the resin-containing bath can be done manually by the use of a retaining rack or the like, or it may be done by a fully automated process, which may include the blow-molding process at the end.

Preferably, the bath contains a dispersion of the high $T_g$ phenoxy-type material and PHAE material, preferably in water into which the resin materials are dispersed. The resins may be used in any form, but as with most materials, smaller sized particles are dispersed more easily than larger particles. Generally, both high $T_g$ phenoxy-type materials and PHAE materials form stable aqueous based dispersions. As noted above, the dispersions may be further stabilized by the addition of a weak acid, such as lactic or phosphoric.

The dip-coating dispersions of the present invention preferably contain about 10 to about 60 percent resin by weight, more preferably about 20 to about 50 percent by weight resin, most preferably about 30 to about 40 percent resin by weight. The temperature of the dispersion in the bath is preferably about 0° to about 100° C., more preferably about 25° to about 50° C. The weight ratio of high $T_g$ phenoxy-type material to PHAE, based on the total weight of the resins, preferably ranges from about 10:90 to about 50:50, and, more preferably, from about 20:80 to about 40:60, based on the total weight of the two resins.

In dip coating, an article, preferably, an injection molded thermoplastic preform, is prepared. Where the article is injection molded, the mold is cooled at a rate sufficiently rapid during the injection molding process to maintain the thermoplastic resin in an amorphous state, rather than allowing it to crystallize. Processes for making thermoplastic articles, such as preforms, by injection molding are generally well known in the art. The surface of the article is preferably free of any oils, surfactants, mold release agents, or the like, so that the coating material can adhere directly to the substrate.

Once the desired dispersion(s) of the PHAE and high $T_g$ phenoxy-type material resins is(are) prepared, the article is dipped into a resin dispersion in the bath to form a layer of the dispersion of the resin on article. Where the article is a preform, it is dipped preferably up to the underside of the support ring 6. The dispersion may be either static or flowing. Preferably, the article is rotated as it is dipped into the coating composition. For a 1 inch diameter article, the rotational speed is preferably from about 30 to 80 rpm, more preferably, from about 40 rpm to about 70 rpm, and, most preferably, from about 50 to about 60 rpm. This allows for thorough coating of the article. As will be recognized by those of skill in the art, the speed of rotation is preferably slower for larger objects, as the circumference to the object, and, thus, the speed of the surface through the dispersion is proportional to its diameter. For example, where the diameter is doubled, the rotational speed should be decreased by a factor of about 2. The article is preferably dipped for a period of time sufficient to allow for complete coverage. Generally, only about 0.25 to about 5 seconds is required, although longer and shorter periods may be used, depending upon the application. Longer residence times do not appear to provide any added coating benefit. Therefore, the preform is preferably submerged in the resin dispersion in the bath for no more than about 30 seconds, and, more preferably, is submerged for from about 2 to about 5 seconds.

The article is then withdrawn from the bath, and dried until substantially no liquid material from the dispersion remains on or in the surface coating. The article may be dried by any method known in the art, such as air-drying, vacuum drying, infrared ("IR") drying, and/or heating. The drying method will depend upon the liquid material in the dispersion and the desired drying rate. Additional dipping and drying steps may be performed to create additional layers if desired. The thickness of the coating is preferably from about 0.01 to about 3 mm, and, more preferably, from about 0.1 to about 1 mm. Preferably, the coated article is dried prior to any further processing, such as blow molding.

In determining the dipping time and, thus, the speed, the turbidity of the coating composition should also be considered. If the container is dipped too quickly, the coating composition may become wavelike and splatter causing coating defects. In addition, dispersions of many coating compositions form foam and/or bubbles, which can interfere with the coating process. To reduce or eliminate foaming and/or bubbles, the dipping speed is preferably adjusted, such that excessive agitation of the coating composition is avoided. If necessary anti-foam/bubble agents may be added to the coating dispersion.

Coated preforms produced from dip-coating are preferably of the type illustrated in FIG. 3. The coating 22 is disposed on the body portion 4 of the preform only, such that the neck portion 2 is free of the coating. In those applications where the contents of the container blown from the preform will be a food or beverage, the interior of the coated preform 16 should not be coated with the high $T_g$ phenoxy-type and PHAE resins, as those materials are not approved by the FDA for contact with food and beverages.

Coated articles in accordance with the present invention may also be obtained by spray coating. In accordance with this method of the invention, preforms or other articles are sprayed with an aqueous dispersion comprising high $T_g$ phenoxy-type and PHAE resins, or the articles are sequentially sprayed with a first dispersion comprising PHAE, and then with a second dispersion, comprising a high $T_g$ phenoxy-type resin, where each resin is dispersed to form an aqueous dispersion of the type described above for dip coating. The spraying of the articles can be done manually or by use of an apparatus that provides for spraying and post-spray treatment in one machine.

A preferred apparatus for spray coating thermoplastic preforms is disclosed in U.S. Pat. No. 4,538,542 to Kennon, et al., the teachings of which are incorporated herein by reference to the extent necessary to describe the apparatus, and is available commercially from Nordson Corporation, Amherst, Ohio. The apparatus disclosed by Kennon et al. comprises a spray coating chamber, a drying chamber, and a conveyor for moving the preforms between the two chambers. The apparatus may further comprise an overspray recovery system.

Preferably, in spray coating process, each article is clasped by a portion of the apparatus configured and adapted for that purpose, and mounted on a conveyor. For example, when preforms are spray coated, the neck portion of each preform is clasped by the apparatus. The articles are preferably evenly spaced on the conveyor, and conveyed into a spray coating chamber in which they pass in close proximity to a series of spray nozzles, which are preferably airless. The dispersions are sprayed through the nozzles, impacting the outer surface of each article preform as it passes through the chamber, providing a wet coating layer. To facilitate adherence of the resins to the articles, and to expedite the evaporation of the aqueous material in the dispersion, the articles are preferably pre-heated prior to coating by any useful method known in the art.

As with dip coating, the articles are preferably rotated during spraying with the coating composition. Again, a 1 inch diameter article is preferably rotated at a speed of about 30 to 80 rpm, more preferably, about 40 rpm to about 70 rpm, and, most preferably, from about 50 rpm to about 60 rpm, where the rotational speed for larger diameters is proportionally slower. This allows for thorough coating of each article. The rotational speed should be adjusted to account for the diameter of larger articles.

The article is preferably sprayed for a period of time sufficient to allow for thorough coverage of the article. Generally, about 0.25 to about 5 seconds is sufficient, although longer or shorter times may be required, depending on the article and the coating composition. As with dip coating, a longer residence time does not appear to provide additional benefit, and, thus, articles are preferably sprayed with the resin dispersion in the bath for no more than about 30 seconds. More preferably, the articles are sprayed for from about 2 to about 5 seconds.

The properties of the coating composition should be considered in determining the spraying time, nozzle size and configuration, and the like. If the spraying rate is too high and/or the nozzle size incorrect, the coating composition may splatter causing coating defects. If the speed is too slow and/or the nozzle size incorrect, the resulting coating may be thicker than desired. As with dipping, foaming and/or bubbles can also interfere with the coating process, but may be avoided by selecting the spraying speed, nozzle, and fluid connections to avoid excessive agitation of the coating composition. If necessary anti-foam/bubble agents may be added to the coating dispersion.

The wet, sprayed coated articles are conveyed out of the spray coating chamber into a drying chamber, which, as with dip coating, may comprise an oven, a plurality of heat lamps, such as IR lamps, or any other source of thermal energy that will provide the temperature necessary evaporate and/or drive off the liquid in the wet coating layer. As will be recognized by those skill in the art, the temperature should no be sufficiently high as to distort or otherwise damage the coated articles. As the articles pass through the drying chamber, the liquid is evaporated, leaving a dried and/or cured coating on the preforms.

In the flow coating process of the invention, the article passes through a flowing sheet of a dispersion of PHAE and/or high $T_g$ phenoxy-type material, similar to a falling shower curtain or waterfall. As discussed above with regard to spray and dip coating methods, the resins may be applied together in a single dispersion or sequentially in separate dispersions. Preferably, flow coating occurs with a short residence time of the article in the flow of coating composition. The article need only pass through the sheet for a period of time sufficient to coat the surface of the article. Again, a longer residence time does not provide any additional benefit for the coating. In order to provide an even coating, the article is again preferably rotated as it passes through the sheet of coating composition. Again, a 1 inch article is preferably rotated at a speed of about 30 to 80 rpm, more preferably, about 40 rpm to about 70 rpm, and, most preferably, from about 50 rpm to about 60 rpm, where the rotational speed for larger diameters is proportionally slower. More preferably the article is rotating and placed at an angle as it passes through the flow of the dispersion. The angle of the article is preferably acute to the plane of the flow of the dispersion. This advantageously allows for thorough coating of the article without coating the neck portion or the inside of a hollow article.

The dispersion of coating material is preferably contained in a tank or other suitable article in fluid communication with the production line in a closed system, and is preferably recycled to prevent the waste of any unused coating composition. This may be accomplished by returning the flow stream to the coating composition tank, but is preferably accomplished in a manner that avoids foaming and the formation of bubbles, as foaming and bubbles can interfere with the coating process. The dispersion of coating composition is preferably removed from the bottom or middle of the tank to prevent or reduce the foaming and bubbling. Additionally, it is preferable to decelerate the flow of the dispersion prior to returning it the coating tank to further reduce foaming and/or bubbles. This can be done by means known to those of skill in the art. If necessary at least one anti-foaming agent may be added to the coating dispersion.

In choosing the proper flow rate of the dispersion of the coating composition, several variables should be considered to provide proper sheeting, including flow rate velocity, length and diameter of the article, line speed, and article spacing. The flow rate determines the accuracy of the flow of the dispersion. If the flow rate is too fast or too slow, the dispersion may not uniformly coat the articles. When the flow rate is too fast, the material may splatter and/or overshoot the production line, causing incomplete coating of the article, waste of the coating composition, and increased foaming and/or bubble problems. If the flow rate is too slow the coating composition may only partially coat the article.

The length and the diameter of the article to be coated should also be considered when choosing a flow rate. The sheet of material should thoroughly cover the entire article, therefore flow rate adjustments may be necessary when the length and diameter of articles are altered. The proper flow rate is easily determined by those of skill in the art.

Another factor to consider is the spacing of the articles on the line. As the articles are run through the flow of the dispersion, a "wake effect" may be observed. If the one article passes through the flow of the dispersion in the wake of another article, it may not receive a proper coating. Therefore it is important to monitor the speed and center line of the articles. The speed of the articles will be dependant on the throughput of the specific equipment used.

Advantageously, the preferred methods provide a sufficiently efficient deposition of the PHAE and/or high $T_g$ phenoxy-type resins that there is virtually no excess material that requires removal. However, in certain applications, it may be necessary to remove excess coating composition after the article is coated by any of the dip, spray, or flow methods. Preferably, the rotational speed and gravity will normalize the sheet on the article, and remove any excess material. If the holding tank for the coating composition is positioned in a manner that allows the article to pass over the tank after coating, the rotation of the article and gravity should cause some excess material to drip off of the article back into the coating composition tank. This allows the excess material to be recycled without any additional effort. If the tank is situated in a manner where the excess material does not drip back into the tank, any other suitable means for catching the excess material and returning it to be reused may be employed.

Where the above methods are impractical due to production circumstances or insufficient, various methods and apparatus known to those skilled in the art may be used to remove the excess material. For example, a wiper, brush, air knife or air flow may be used alone or in combination. Further, any of these methods may be combined with the rotation and gravity method described above. Preferably any excess material removed by these methods is recycled for further use.

After the article has been coated and any excess material removed, the coated article is then dried and/or cured. Preferably, infrared ("IR") heating is used in the drying and curing process. For example, a 1000 W General Electric Q1500 T3/CL Quartzline Tungsten-Halogen quartz IR lamp is a preferred IR source. Equivalent sources may be purchased commercially from any of a number of sources, including General Electric and Phillips. The intensity of the IR source may be varied to provide the desired rate of drying, and/or multiple sources may be used.

In addition, the use of infrared heating allows for the coating to dry without overheating the substrate. It has also been found that use of IR heating can reduce blushing and improve chemical resistance.

Although curing and/or drying may be performed without additional air, IR heating is preferably combined with forced air. The air used may be at any useful temperature. The combination of IR and air curing provides the unique attributes of superior chemical, blush, and scuff resistance of preferred embodiments. Further, without wishing to be bound to any particular theory, it is believed that the coating's chemical resistance is a function of cross-linking and curing. The more thorough the curing, the greater the chemical and scuff resistance.

In determining the length of time necessary to thoroughly dry and cure the coating several factors, such as coating material, thickness of deposition, and article substrate, should be considered. Different coating materials cure at different rates. In addition, as the degree of solids increases, the cure rate decreases. Generally, for articles with about 0.05 to about 0.75 grams of coating material, the curing time is about 10 to 120 seconds, although longer and shorter times may be required depending on the size of the article, the thickness of the coating, and the curing/drying method.

The use of a current of air in addition to IR heating regulates the surface temperature of the article, providing flexibility in the control of the penetration of the radiant heat. If a particular embodiment requires a slower cure rate or a deeper IR penetration, this can be controlled with a current of air, the exposure time to the IR radiation, the IR lamp frequency, or a combination thereof.

Preferably, the article rotates as it is dried, such as by exposure to the output of an IR heater. Again, a 1 inch article is preferably rotated at a speed of about 30 to 80 rpm, more preferably, about 40 rpm to about 70 rpm, and, most preferably, from about 50 rpm to about 60 rpm, where the rotational speed for larger diameters is proportionally slower. If the rotation speed is too high, the coating will spatter, causing uneven coating of the article. If the rotation speed is too low, the article will dry unevenly, unless the exposure to the IR radiation is uniformly distributed on the coated surface of the article. Gas heaters, UV radiation, flame, and the like may also be employed in addition to or in lieu of IR heating.

The article is then cooled in a process that, combined with the curing process, provides enhanced chemical, blush and scuff resistance. It is believed that this is due to the removal of volatiles after a single coating and between sequential coatings. In one embodiment the cooling process occurs at ambient temperature. In another embodiment, the cooling process is accelerated by the use of forced ambient or cool air.

Cooling time is also affected by the point in the process where the cooling occurs. In a preferred embodiment multiple coatings are applied to each article. When the cooling step is prior to a subsequent coating, cooling times may be reduced, as elevated article temperature is believed to enhance the coating process. Although cooling times vary, they generally range from about 5 to about 40 seconds for a 24 gram preform, having a coating of from about 0.05 to about 0.75 grams of coating material.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

What is claimed:

1. A method of coating an article, the method comprising: applying a coating composition comprising a high $T_g$ phenoxy-type material having a $T_g$ of at least about 75° C. to at least a portion of a surface of an article; and forming a dried/cured coating comprising the high $T_g$ phenoxy-type material on the article surface; wherein the coating composition comprising the high $T_g$ phenoxy-type material further comprises a PHAE; or the article surface comprises a coating comprising a PHAE; or the coating comprising the high $T_g$ phenoxy-type material further comprises a PHAE, and the article surface comprises a coating layer comprising a PHAE.

2. The method according to claim 1, wherein the applied coating composition is a dispersion comprising the high $T_g$ phenoxy-type material.

3. The method according to claim 2, wherein the dispersion further comprises a PHAE.

4. The method according to claim 3, wherein the dispersion comprises from about 90 to about 50 percent by weight of PHAE material and from about 10 to about 50 percent by weight of high $T_g$ phenoxy-type material, based on the total weight of the solids in the dispersion.

5. The method according to claim 2, wherein the dispersion further comprises at least one additive.

6. The method according to claim 5, wherein the additive comprises at least one of a UV blocker, a pigment, a cross-linker, and a metallized pigment.

7. The method of claim 1, wherein the article is a thermoplastic preform or container.

8. The method according to claim 7, wherein the thermoplastic article comprises a thermoplastic polyester.

9. The method according to claim 8, wherein the thermoplastic polyester is selected from the group consisting of PET, PEN, polypropylene, and blends of PET and PEN.

10. The method according to claim 1, wherein the article comprises glass.

11. The method according to claim 1, wherein the high $T_g$ phenoxy-type material has a $T_g$ of from about 75° C. to about 110° C.

12. The method according to claim 1, further comprising blending a dispersion of the PHAE material and a dispersion of the high $T_g$ phenoxy-type material to form a dispersion of PHAE material and high $T_g$ phenoxy-type material prior to the applying step.

13. The method according to claim 1, further comprising forming a melt blend of the PHAE material and the high $T_g$ phenoxy-type material; and dispersing the melt blended material to form a dispersion of the PHAE material and the high $T_g$ phenoxy-type material.

14. The method according to claim 13, further comprising forming the melt blend by co-extruding the high $T_g$ phenoxy-type material and PHAE material.

15. The method according to claim 1, further comprising:
forming a dispersion of PHAE material, and applying the PHAE dispersion to the article using a dip, spray, or flow coating process to the coating layer comprising PHAE material.

16. A coating composition, comprising two resins, wherein:
the first resin is a high $T_g$ phenoxy-type material, and the second resin is a PHAE material;
the two resins are present in a weight ratio of high $T_g$ phenoxy-type material to PHAE of from about 10:90 to about 50:50, based on the total weight of the two resins; and
the composition is one of a dispersion of the two resins, adapted for dip, spray, or flow coating, and a melt blend of the two resins, adapted for overmolding.

17. A coated article, comprising:
an article substrate, having a surface; and
a coating layer comprising a high $T_g$ phenoxy-type material having a $T_g$ of at least about 75° C. on at least a portion of the surface of the article; wherein
the coating layer comprising the high $T_g$ phenoxy-type material further comprises a PHAE; or
a coating layer comprising a PHAE is positioned between the coating layer comprising the high $T_g$ phenoxy-type material and the article substrate surface; or
the coating layer comprising the high $T_g$ phenoxy-type material further comprises a PHAE, and a coating layer comprising a PHAE is positioned between the coating layer comprising the high $T_g$ phenoxy-type material and the article substrate surface.

* * * * *